Jan. 5, 1954 J. W. WIESMANN 2,665,027
UNDERFLOOR WIRE DISTRIBUTING SYSTEM
Filed Nov. 7, 1946 3 Sheets-Sheet 1

INVENTOR.
Joseph W. Wiesmann
BY
J. Stanley Churchill
ATTORNEY

Jan. 5, 1954 J. W. WIESMANN 2,665,027
UNDERFLOOR WIRE DISTRIBUTING SYSTEM
Filed Nov. 7, 1946 3 Sheets-Sheet 2

Fig. 2

INVENTOR.
Joseph W. Wiesmann
BY
J. Stanley Churchill
ATTORNEY

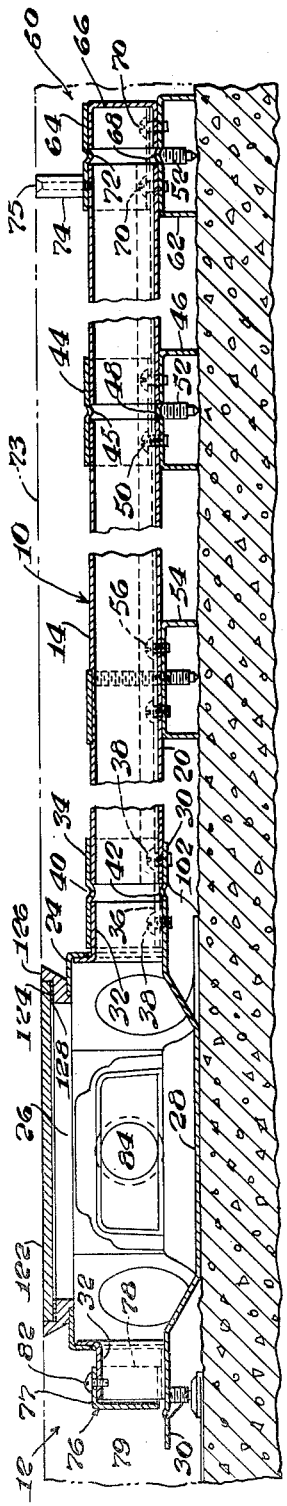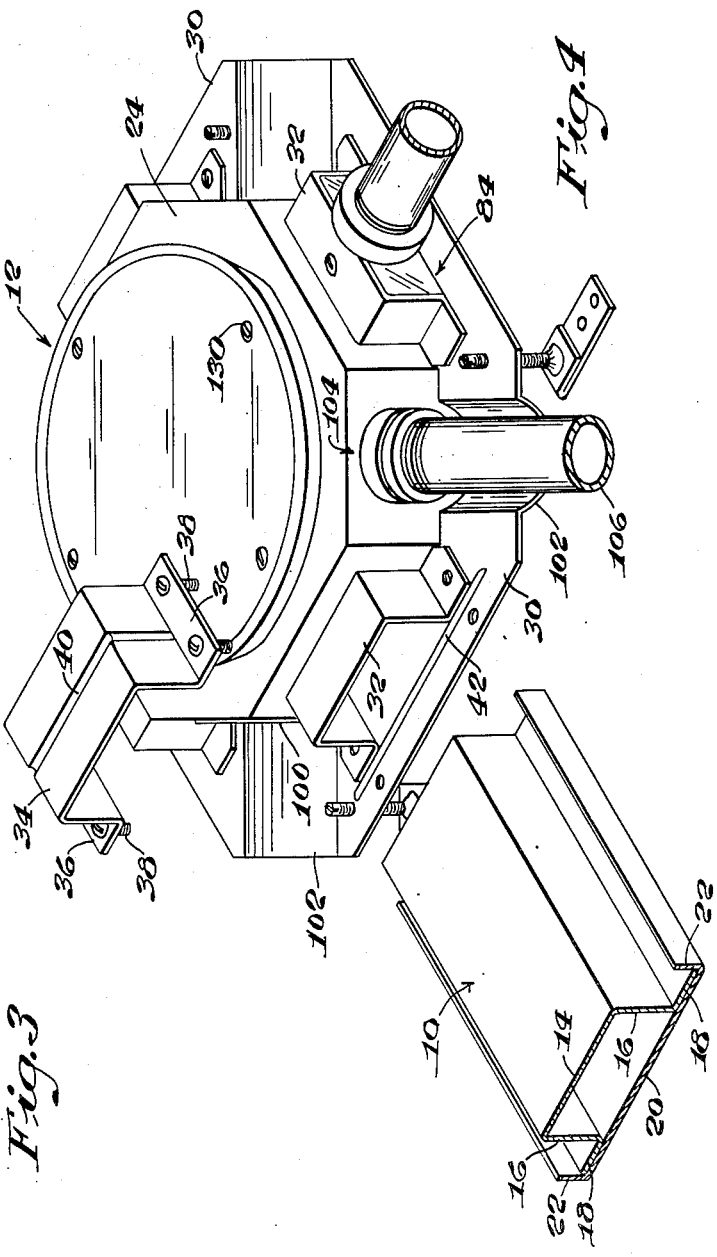

Patented Jan. 5, 1954

2,665,027

UNITED STATES PATENT OFFICE 2,665,027

UNDERFLOOR WIRE DISTRIBUTING SYSTEM

Joseph W. Wiesmann, Pittsburgh, Pa., assignor to H. H. Robertson Company, Pittsburgh, Pa., a corporation of Pennsylvania Application November 7, 1946, Serial No. 708,419

1 Claim. (Cl. 220—3.8)

This invention relates to an underfloor wire distributing system and particularly to apparatus for use in an underfloor wire distributing system.

The invention has for an object to provide novel and improved apparatus embodied in an underfloor wire distributing system and which includes a cellular metallic duct having one or more cells, and junction boxes for connection therewith of novel and improved construction arranged to permit electrical service to be furnished throughout a building in a simple, economical and efficient manner.

With this general object in view, and such others as may hereinafter appear, the invention consists in the underfloor wire distributing apparatus and in the various structures, arrangements and combinations of parts hereinafter described and particularly defined in the claims at the end of this specification.

In the drawings illustrating the preferred embodiment,

Fig. 2 is a plan view of a junction box embodied in the present apparatus;

Fig. 3 is a longitudinal cross sectional view of the apparatus shown in Fig. 2, as viewed from the line 3—3; and Fig. 4 is a perspective view of the junction box shown in Figs. 2 and 3.

Figure 1:
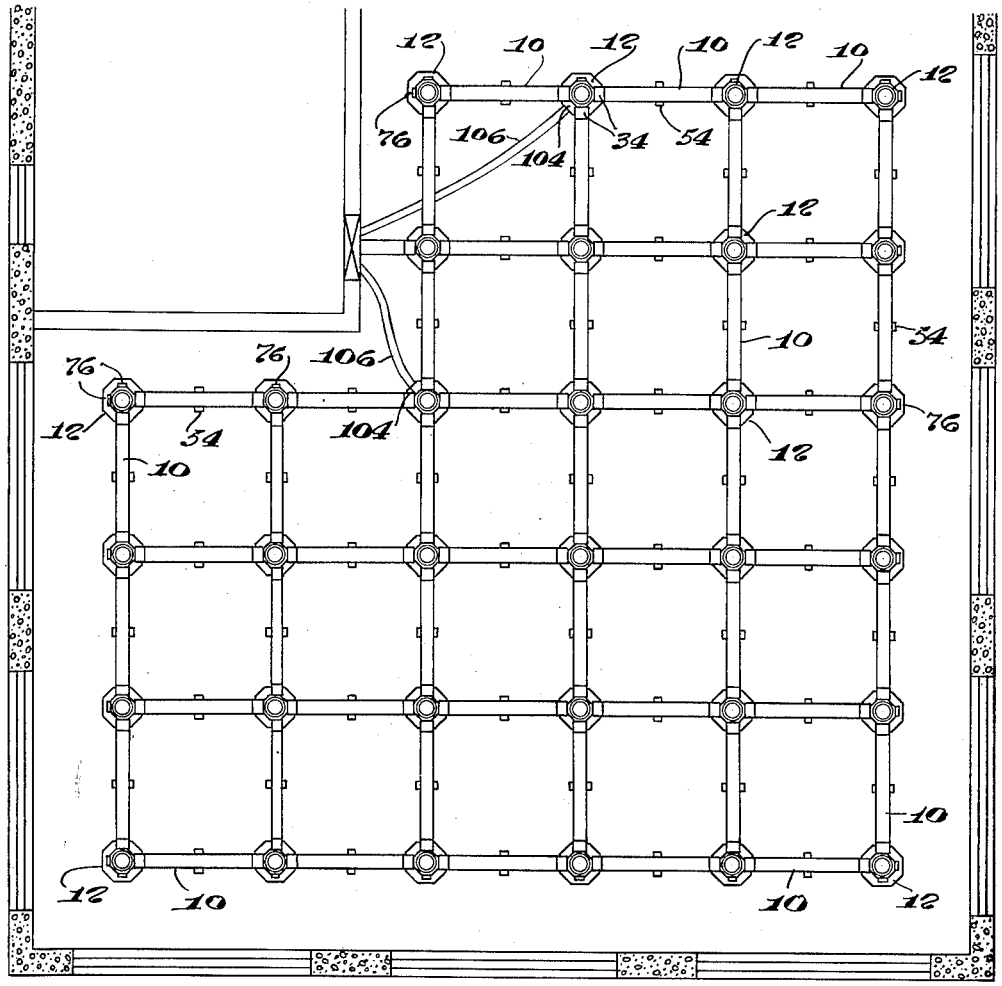
Fig. 1 is a plan view of an underfloor wire distributing system embodying the present invention.

In general, the present invention contemplates an underfloor wire distributing system having provision for isolating the various electrical services provided in a building and includes novel single or multiple duct conduits or raceways adapted to be connected to junction boxes of novel and improved construction through which access may be had to the various systems for connection to branch circuits.

In prior underfloor wiring distribution systems, such as those illustrated in the patents to Sargent No. 2,041,965 and to Young et al. No. 2,125,366, the wiring ducts comprised the corrugated multicellular floor supporting members of the building which were made available by the use of cross over ducts arranged to run transversely and on top of the floor supporting members. The cross over ducts were further provided with junction boxes or upwardly extending headers having access openings in the top thereof, the tops of the junction boxes being arranged to extend substantially flush with the subsequently applied concrete floor fill and the finish flooring. Consequently, in such prior structures, the height of the floor fill above the top of the cellular flooring included the height of the cross over duct and the height of the upwardly extending junction box thus requiring an excessive amount of floor fill for most purposes, this dimension amounting to between 2 to 2½ inches in practice.

Accordingly, it is the aim of the present invention to provide an underfloor wiring distribution apparatus designed for a building which is not provided with cellular floor supporting members of the type described in the above patents, and wherein individual single cell or multi-cellular ducts may be employed together with junction boxes especially designed to receive the present duct. In accordance with one feature of the present invention the cellular ducts are arranged to be directly connected to the junction boxes and to extend in the same horizontal plane therewith thus permitting a substantial reduction in the height of the subsequently applied floor fill, which in the illustrated embodiment of the invention amounts to approximately 1¼ inches. Other features include an all metallic and relatively light weight duct and junction box structure thus eliminating excessive bulk and weight and providing an adequate ground for the system.

Referring now to the drawings, Fig. 1 illustrates a typical underfloor wire distributing system embodying the present invention and in which 10 represents individual connected lengths of the present duct structure, and 12 represents the single duct junction boxes adapted for connection with the duct 10. The present duct structure 10 comprises an elongated metallic member of inverted U-shape in cross section having an upper wall 14, side walls 16 provided with flanges 18 extended outwardly from their lower ends, and a bottom wall 20 which may and preferably will be connected to the flanges 18 by spot welding to form a unitary duct as illustrated. As herein shown, the bottom wall 20 is provided with upturned marginal edges 22.

As illustrated in Figs. 2 and 3, the junction box 12 for use with the duct 10 comprises an octagonally shaped hollow body portion 24 having a cylindrical access opening 26 in its upper wall and provided with a dish shaped base portion 28 having a laterally extended flange or shelf 30 also being octagonally shaped in plan as shown in Fig. 2. The junction box is provided with an opening in each of the side walls which are disposed at right angles to one another and each opening is defined by a projecting sleeve 32 formed integrally with the box and having substantially the same cross-sectional dimensions as the inverted U-shaped duct 10.

Provision is made for connecting the duct 10 to the projecting sleeves 32 in a manner such as to provide in effect a continuation of the sleeve 32 without reducing the interior dimensions at the connection and as herein shown, this may be accomplished by an entrance clamp 34 arranged to fit over adjacent portions of the sleeve and duct. The flanged portions 36 of the entrance clamp are provided with preformed openings which are arranged to align with openings in the flanged portions of the sleeve and duct and with tapped openings formed in the base flange 30 of the junction box, the parts being held in assembled relation by screws 38 to form a firm and secure connection between the duct and the junction box. As further illustrated in Figs. 2 and 3, the entrance clamp 34 is provided with an inwardly depressed portion 40, forming an intermediate detent extending across the top and side walls of the clamp and which is designed to serve as a stop or spacing element between the adjacent ends of the sleeve 32 and duct 10. A similar upset portion or ridge 42 formed in the base flange 30 is arranged in alignment with the assembled clamp and is engaged by the bottom wall 20 of the duct, said ridges forming spacing elements between the ends of the sleeves and said duct.

From the description thus far it will be observed that the present underfloor duct and junction box unit may be connected without reducing the available space within the duct or the junction box and that the positive connection between the duct and the sleeve forms an adequate and efficient ground for the system. The present junction box 12 may and preferably will be made of relatively light weight sheet metal thus materially reducing the weight of the unit and also providing a relatively greater internal area as compared with a unit of similar outside dimensions but made of heavier metal.

In practice the individual duct sections 10 may be formed in suitable standard lengths, such as 12 feet long, and provision is made for connecting the ducts end to end to form a continuation of the raceway. For this purpose a coupling member 44 and support 46 are provided, as shown in Fig. 3. The support 46 extends transversely of the duct and comprises an inverted U-shaped member arranged to support the adjacent ends of the ducts and is provided with a central upset portion 48 against which the adjacent ends of the ducts are placed. The coupling member 44 is also provided with a centrally disposed depressed portion 45 and is arranged to fit over the adjacent ends of the ducts in a manner similar to the entrance clamp 34 and the parts are held in assembled relation by screws 50, arranged to fit into preformed and aligned openings in the duct, coupling and support, the latter being provided with tapped holes, thus forming a positive and secure connection for grounding purposes and without decreasing the internal area of the duct. As shown in Fig. 2, the support 46 extends transversely beyond the duct on both sides and is provided at its outer ends with leveling screws 52 arranged to be adjusted to level the duct with relation to the floor. An intermediate support 54 may also be provided intermediate the ends of the individual ducts, as illustrated in Fig. 2, the duct 10 and support 54 being provided with preformed and aligned openings to receive attaching screws 56. The intermediate support is likewise provided with leveling screws 52 at the laterally extended ends of the support.

An end closure may also be provided for the duct 10 where required, such as is indicated at 60, and, as illustrated in detail in Figs. 2 and 3, the duct end closure comprises a base or support 62, a clamping or coupling member 64 and a cap or closure member 66. In assembling the closure the end of the duct 10 is placed on one side of the base member 62 and the cap member 66 may be placed in alignment with the end of the duct on the opposite side of the base. The adjacent ends of the duct and cap member are of substantially the same cross sectional dimensions and are spaced apart by a central upset portion 68 formed in the base 62. The coupling member 64 may then be placed over the adjacent edges of the duct and cap member and secured to the duct, cap and base by screws 70, as illustrated. The coupling member 64 is also provided with an intermediate depressed portion 72 for spacing purposes, and, the base member 62 is provided with adjusting or leveling screws 52. In practice, each end closure 60 is provided with an end marker 74 arranged to extend upwardly so that its upper end will be flush with the level of the screed line or finished floor herein indicated by the dot and dash line 73 in Fig. 3. As herein shown, the marker 74 is secured to the end of the duct by a screw 75 extending through a central bore in the marker, through the top wall of the coupling and into a tapped hole in the end of the duct.

In Fig. 2, the remaining sleeve projections 32 have been provided with typical fittings illustrative of those indicated generally in the distribution system layout shown in Fig. 1. Such fittings include a closure for an unused box duct opening, as shown at 76 in Figs. 2 and 3, and which comprises a cap member having a top wall 77, side walls 78 and a closure wall 79, extended portions 80 of the side walls 78 being bent over the edges of the closure wall, as illustrated. The end closure 76 is fitted over the projecting sleeve 32 defining the box opening and is attached thereto by a screw 82.

As illustrated generally at 84 in Fig. 2, provision may also be made for providing a sleeve portion 32 with a conduit adapter which comprises a hollow fitting having an internally threaded cylindrical hub portion 86 at one end for receiving the conduit, and having a substantially rectangular shaped portion 88 at its other end arranged to fit within the sleeve opening. The adapter may be secured to the sleeve by a screw 90. The remaining sleeve projection 32 is also provided with an entrance clamp 34 similar to the one above described for connecting a length of duct 10 thereto, and, at the outer end of the duct is illustrated generally a fitting 92 comprising a conduit adapter to permit connection of a conduit to the end of the duct. The fitting 92 includes parts similar to those used for the duct end closure 60, except that the cap member 66 is removed and in its place is provided a conduit adapter 84 above described, similar parts being identified by the same numerals as in the above description.

Referring again to Fig. 2, it will be observed that the remaining four sides of the octagonally shaped body portion 24 of the junction box 12, comprising opposed diagonally disposed sides are each provided with a preformed knockout 100 of the type which may be easily removed for receiving a conduit connection for the feed wires or additional branch circuits. Furthermore in order to provide ample clearance for the conduit and the connecting coupling, the base flange 30 is provided with a concave portion 102 concentric with the knockout opening, the bottom of the flange at this point being substantially in horizontal alignment with the bottom of the dished out base member 28.

As illustrated in Fig. 2, a conduit connector of novel construction, indicated generally at 104, may be provided for connecting a conduit 106 to the wall around the knockout opening 100 of the junction box from the outside of the box, and may be generally used in other places where access to the opposite side of the connecting wall is inconvenient, difficult or impossible.

As above described, the top of the junction box extends flush with the level of the finish flooring and, as herein shown, the access opening 26 is provided with a cover 122 flush with the top of the box and arranged to fit in a circular groove 124 formed in a cylindrical sleeve 126 defining the access opening. A washer or gasket 128 may also be provided as shown and the cover may be secured in place in the groove by screws 130, as illustrated in Fig. 4. The outside diameter of the cylindrical sleeve 126 may and preferably will be tapered as illustrated with the large diameter of the taper at top, providing in effect an externally recessed collar around the cover to provide an efficient anchorage for the subsequently applied concrete floor fill.

From the above description it will be observed that the present underfloor wire distributing duct and the fittings and connections above described, are adapted for use with a shallow flooring, in which the ducts are arranged in the same plane as the junction boxes.

While the preferred embodiment of the invention has been herein illustrated and described it will be understood that the invention may be embodied in other forms within the scope of the following claim.

Having thus described the invention, what is claimed is:

In an underfloor wire distribution system, in combination, a sheet-metal junction box having a dish-shaped bottom wall terminating in a lateral edge defining outwardly extended flanges forming a horizontal shelf spaced above the plane of said bottom wall, and having an access opening in its upper wall provided with a removable cover member, a side wall of said box having an opening therein defined by a substantially rectangular sheet-metal entrance sleeve having a top wall and side walls projecting horizontally from the junction box and provided with outwardly extended marginal flanges, the horizontal shelf of the junction box forming the bottom wall of said entrance sleeve and extended a substantial distance beyond the end of the sleeve, an elongated unitary metallic duct member of substantially the same cross-sectional dimensions as said sleeve including the marginal flanges, one end of said duct member resting on the extended portion of said shelf in alignment with said entrance sleeve, and means connecting the duct to the junction box comprising a removable clamping member of generally inverted U-shape and spanning the adjacent ends of said entrance sleeve and said duct and being provided with laterally extended marginal portions overlying said sleeve flanges and said duct flanges, and fastening means extending through said marginal portions, flanges and shelf for rigidly connecting the duct to said shelf.

JOSEPH W. WIESMANN.

References Cited in the file of this patent

UNITED STATES PATENTS

| Number | Name | Date |
|---|---|---|
| 211,387 | Driesslein | Jan. 14, 1879 |
| 643,108 | Campbell | Feb. 13, 1900 |
| 667,567 | Page | Feb. 5, 1901 |
| 858,846 | Alexander | July 2, 1907 |
| 1,032,058 | Gilson | July 9, 1912 |
| 1,065,492 | Abbott | June 24, 1913 |
| 1,592,548 | Walker | July 13, 1926 |
| 1,626,570 | Walker | Apr. 26, 1927 |
| 1,782,779 | Fullman | Nov. 25, 1930 |
| 1,812,756 | Riggs | June 30, 1931 |
| 1,814,449 | Morgenstern | July 14, 1931 |
| 1,861,435 | Chamberlain et al. | June 7, 1932 |
| 2,000,850 | Knell | May 7, 1935 |
| 2,041,965 | Sargent | May 26, 1936 |
| 2,081,197 | Goeller | May 25, 1937 |
| 2,125,366 | Young et al. | Aug. 2, 1938 |
| 2,271,798 | Lewin | Feb. 3, 1942 |
| 2,326,841 | Despard | Aug. 17, 1943 |
| 2,357,754 | Moll | Sept. 5, 1944 |
| 2,378,529 | Austin, Jr. | June 19, 1945 |
| 2,425,545 | Lefebre | Aug. 12, 1947 |